US006704010B1

(12) United States Patent
Moreton

(10) Patent No.: US 6,704,010 B1
(45) Date of Patent: Mar. 9, 2004

(54) SYSTEM, METHOD AND ARTICLE OF MANUFACTURE FOR RENDERING TRIANGULAR PATCHES USING HARDWARE EQUIPPED FOR HANDLING QUADRILATERAL PATCHES

(75) Inventor: Henry P. Moreton, Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 253 days.

(21) Appl. No.: 09/655,105

(22) Filed: Sep. 5, 2000

(51) Int. Cl.[7] .............................................. G06T 17/00
(52) U.S. Cl. ....................................... 345/423; 345/506
(58) Field of Search ................................ 345/423, 421, 345/419, 426, 606, 506

(56) References Cited

U.S. PATENT DOCUMENTS

| 5,133,049 A | * | 7/1992 | Cain et al. ................... 345/619 |
| 5,546,515 A | * | 8/1996 | Mochizuki .................. 345/606 |
| 5,774,124 A | * | 6/1998 | Itoh et al. .................... 345/423 |
| 6,198,488 B1 | * | 3/2001 | Lindholm et al. ........... 345/426 |
| 6,211,883 B1 | * | 4/2001 | Goel ........................... 345/423 |
| 6,304,265 B1 | * | 10/2001 | Haris et al. ................. 345/421 |
| 6,456,287 B1 | * | 9/2002 | Kamen et al. .............. 345/427 |

* cited by examiner

Primary Examiner—Mark Zimmermann
Assistant Examiner—Huedung X. Cao
(74) Attorney, Agent, or Firm—Silicon Valley IP Group, PC; Kevin J. Zilka

(57) ABSTRACT

A system, method and article of manufacture are provided for converting triangular patches into a form suitable for being rendered using a graphics pipeline adapted to render quadrilateral patches. First, a triangular patch is received. The received triangular patch is then divided into a plurality of quadrilateral patches. Such quadrilateral patches are suitable for being processed by a graphics pipeline specifically equipped to render quadrilateral patches.

21 Claims, 3 Drawing Sheets

SYSTEM, METHOD AND ARTICLE OF MANUFACTURE FOR RENDERING TRIANGULAR PATCHES USING HARDWARE EQUIPPED FOR HANDLING QUADRILATERAL PATCHES

FIELD OF THE INVENTION

The present invention relates to computer graphics, and more particularly to rendering triangular patches in a computer graphics-processing pipeline.

BACKGROUND OF THE INVENTION

In conventional computer graphic systems, rendering and displaying three-dimensional graphics typically involves many calculations and computations. For example, to render a three-dimensional object, a set of coordinate points or vertices that define the object to be rendered must be formed. Vertices can be joined to form polygons, or primitives, that define the surface of the object to be rendered and displayed. Groups of polygons may be generated using patches. A patch is a mathematical description of a surface that may be sampled by evaluating a collection of the vertices.

Once the vertices that define an object are formed, the vertices must be transformed from an object or model frame of reference to a world frame of reference and finally to two-dimensional coordinates that can be displayed on a flat display device. Along the way, vertices may be rotated, scaled, eliminated or clipped because they fall outside the viewable area, lit by various lighting schemes, colorized, and so forth.

A general system 100 that implements such a pipelined procedure is illustrated in Prior Art FIG. 1. In this system, a tessellator 102 is adapted to use patches to calculate vertices and form triangles. The transform/lighting module 106 may be used to perform scaling, rotation, and projection of a set of three dimensional vertices from their local or model coordinates to the two dimensional window that will be used to display the rendered object. The transform/lighting module 106 also sets the color and appearance of a vertex based on various lighting schemes, light locations, ambient light levels, materials, and so forth.

System 100 further includes a rasterization module 108 that rasterizes or renders triangles that have previously been transformed and/or lit. The rasterization module 108 renders the object to a rendering target which can be a display device or intermediate hardware or software structure that in turn moves the rendered data to a display device.

Traditionally, the tessellator 102 has been equipped to handle quadrilateral patches. Thus, when a triangular patch is encountered, prior art system 100 may employ a trimming module 104 which converts, or "trims," the output of tesselator to produce a triangular subset of the usual quadrilateral collection of triangles. FIG. 2 illustrates an exemplary result of the trimming performed by trimming module 104. In use, the tensor product tessellator 102 is designed to evaluate the entire parameter space $[0 \ldots 1] \times [0 \ldots 1]$, wherein the triangle is only defined on the lower triangular sub-domain. Thus, the output of the tessellator 102 must be trimmed to the triangular domain. It should be noted that in the example of FIG. 2, the relative placement of control points are only approximate. As shown, a triangular patch 200 would be directly rendered by evaluating the triangular patch 200 with the surface (patch) parameters varying from (0,0) to (1,0) and (0,1) at the corners, forming a triangle. A tensor product patch 202 is directly rendered by evaluating the quadrilateral patch 202 with the surface parameters varying from (0,0) to (1,1) at the diagonally opposite corner forming a square. To render a triangular patch 200 using tensor product hardware, it must be converted to tensor product form (using algebra) and then the conventional tensor product hardware must be prevented from rendering its usual full square.

An alternate approach to the solution of FIG. 2 is shown in FIG. 2A. As shown, the technique 204 maps the triangular patch to an equivalent degenerate tensor product that needs no trimming. The problem with this approach is that is results in a poor pattern of tessellation (many sliver triangles). In addition to the poor quality of the tessellation pattern the mapping used results in a parametric singularity. This is a problem because the parametric derivatives (one of the derivatives is undefined at the singularity) of the patch are typically used to compute normal vectors that are subsequently used for lighting. The result is that triangular patches rendered using this technique have a lighting artifact at one corner (the location of the singularity).

While the trimming module 106 and the alternate approach perform a necessary task, the various associated operations can be complex and require a great deal of computing time and overhead. Sometimes, the extra computations are even done when they are not even necessary. Therefore, it is desirable to have a computer graphics system that is capable of providing the rasterization module 108 with triangles without performing conventional prior art trimming operations or other alternate cumbersome approaches.

DISCLOSURE OF THE INVENTION

A system, method and article of manufacture are provided for converting triangular patches into a form suitable for being rendered using a graphics pipeline adapted to render quadrilateral patches. First, a triangular patch is received. The received triangular patch is then divided into a plurality of quadrilateral patches. Such quadrilateral patches are suitable for being processed by a graphics pipeline specifically equipped to render quadrilateral patches.

While triangular patches are used less frequently than quadrilateral patches, or tensor products, they are in use in the graphics community and it is important to be able to render them efficiently. The present invention provides a method for rendering such triangular patches that does not require additional hardware support for trimming operations, and delivers improved performance.

In one embodiment of the present invention, each quadrilateral patch may be convex. As an option, one corner of each quadrilateral patch may be positioned at a midpoint of a side of the triangular patch. Further, one corner of each quadrilateral patch may optionally be positioned at a centroid of the triangular patch.

In another embodiment of the present invention, each side of the quadrilateral patches may be linear in parameter space. Also, a degree of the triangular patch may be preserved after being divided into a plurality of quadrilateral patches.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 1:
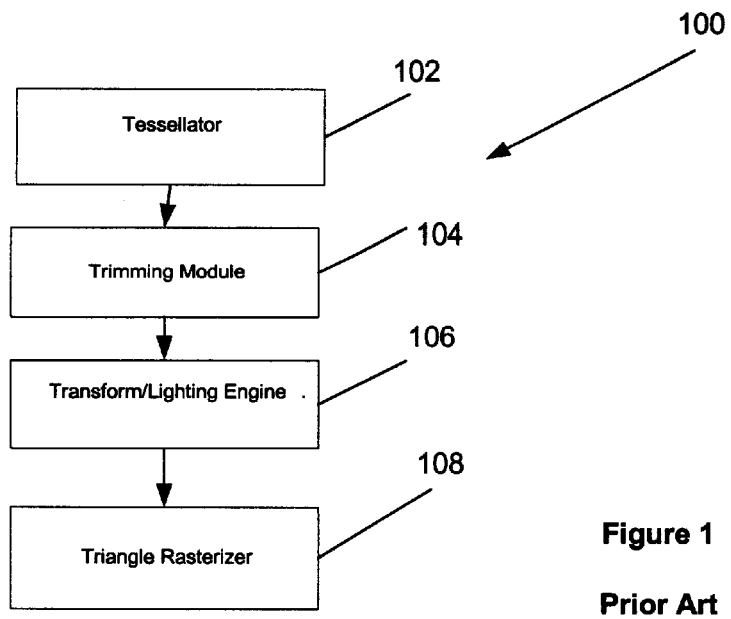
FIG. 1 is a block diagram of a portion of a prior art computer graphics system with processing units capable of supporting graphics processing.
Figure 2:
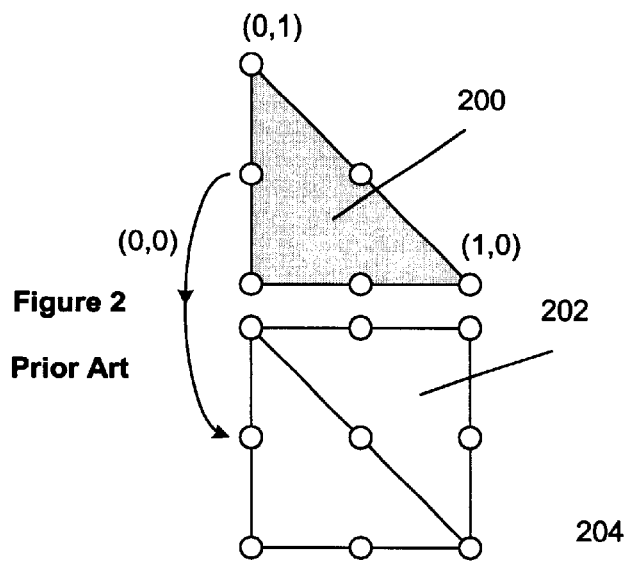
FIG. 2 illustrates an exemplary result of the trimming performed by a prior art trimming module.
Figure 2A:
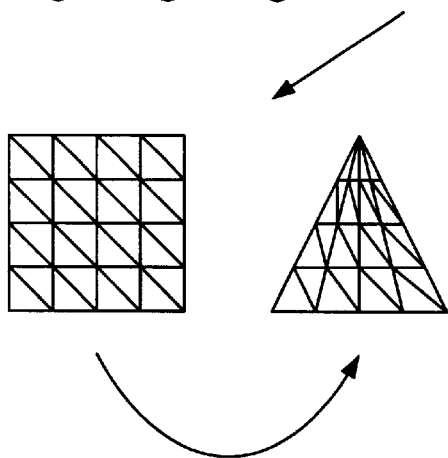
FIG. 2A illustrates an exemplary prior art technique of dealing with triangular patches.
Figure 3:
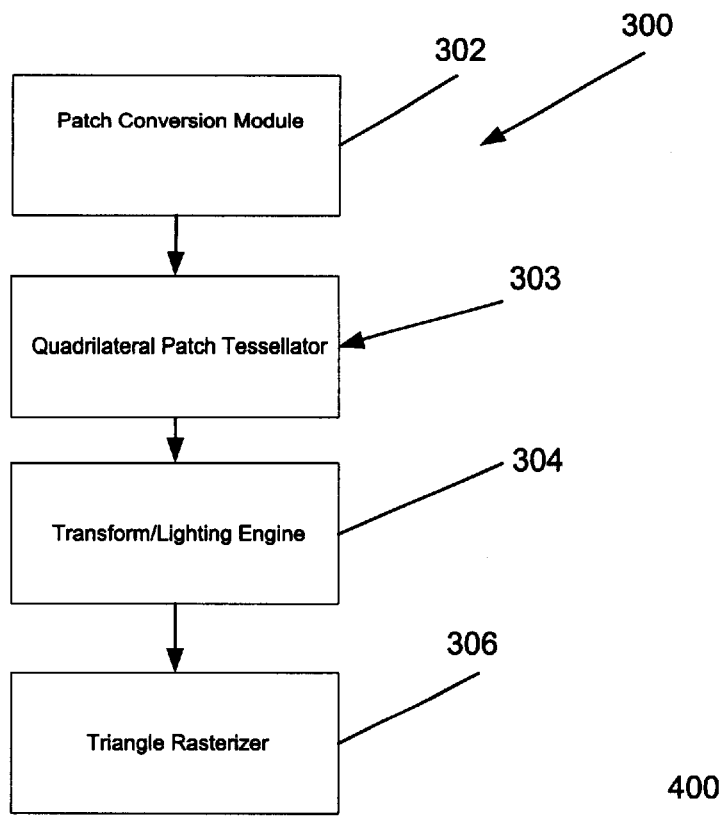
FIG. 3 is a schematic diagram of one exemplary hardware configuration in accordance with the present invention.

FIG. 3 is a schematic diagram of one exemplary hardware configuration 300 constructed in accordance with the present invention. As shown, the hardware 300 includes a patch conversion module 302, a quadrilateral patch tesselator 303, a transform/lighting engine 304, and a triangle rasterizer 306. As is well known in the art, the quadrilateral patch tesselator 303 converts a patch into a plurality of triangles. It should be noted that the quadrilateral patch tessellator 303 is specifically configured to handle quadrilateral patches, or tensor products.

The transform/lighting engine 304 may be used to perform scaling, rotation, and projection of a set of three dimensional vertices from their local or model coordinates to the two dimensional window that will be used to display the rendered object. The transform/lighting engine 304 also sets the color and appearance of a vertex based on various lighting schemes, light locations, ambient light levels, materials, and so forth.

Also well known is the rendering engine 306 that rasterizes or renders vertices that have previously been transformed and/or lit. The triangle rasterizer 306 renders the object to a rendering target which can be a display device or intermediate hardware or software structure that in turn moves the rendered data to a display device.

With continuing reference to FIG. 3, coupled to the quadrilateral patch tessellator 303 is the patch conversion module 302. In operation, the patch conversion module 302 is adapted for converting triangular patches into a form suitable for being rendered using a graphics pipeline adapted to render quadrilateral patches. In particular, the patch conversion module 302 converts the triangular patches into a plurality of quadrilateral patches that the quadrilateral patch tessellator 303 is equipped to handle.

The conversion, or reparameterization, of the triangular patches is such that all of the geometric properties of the original patch are preserved. Further the reparameterization is free of the problematic singularities required by some prior art techniques. It should also be noted that the triangular patches are characterized using polynomials of various degrees. In one embodiment, the conversion may also leave the degree of the patches unchanged, i.e. it does not increase. By way of example, the reparameterization may be characterized as follows: Given a triangular patch, T(u,v), the variables u and v are replaced using the expressions:

$$u = \frac{s}{2} - \frac{st}{6}, v = \frac{t}{2} - \frac{st}{6}.$$

It should be noted that if the parameter value pair (0,0),(0,1),(1,0),(1,1) are substituted for s and t, the expected parameter value pairs for u and v are as follows: (0,0),(0,1/2),(1/2,0),(1/3,1/3).

Figure 4:
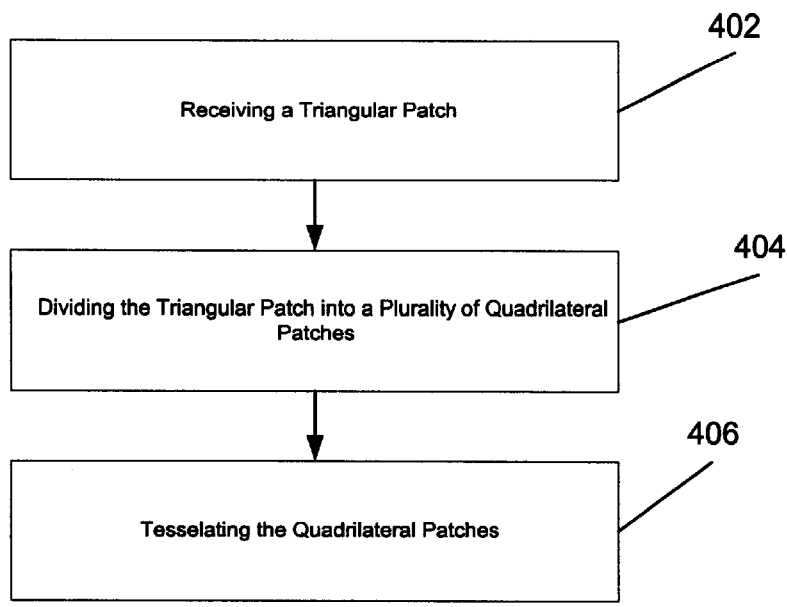
FIG. 4 is a flowchart illustrating the method by which the patch conversion module of FIG. 3 converts the triangular patches in accordance with one embodiment of the present invention.

FIG. 4 is a flowchart illustrating the method 400 by which the patch conversion module 302 of FIG. 3 converts the triangular patches. As shown, a triangular patch is first received in operation 402. Then, in operation 404, the received triangular patch is divided into a plurality of quadrilateral patches. Such quadrilateral patches are then suitable for being processed by a graphics pipeline specifically equipped to render quadrilateral patches. To this end, the quadrilateral patch tessellator 303 may then tessellate the quadrilateral patches in operation 406.

Figure 5:
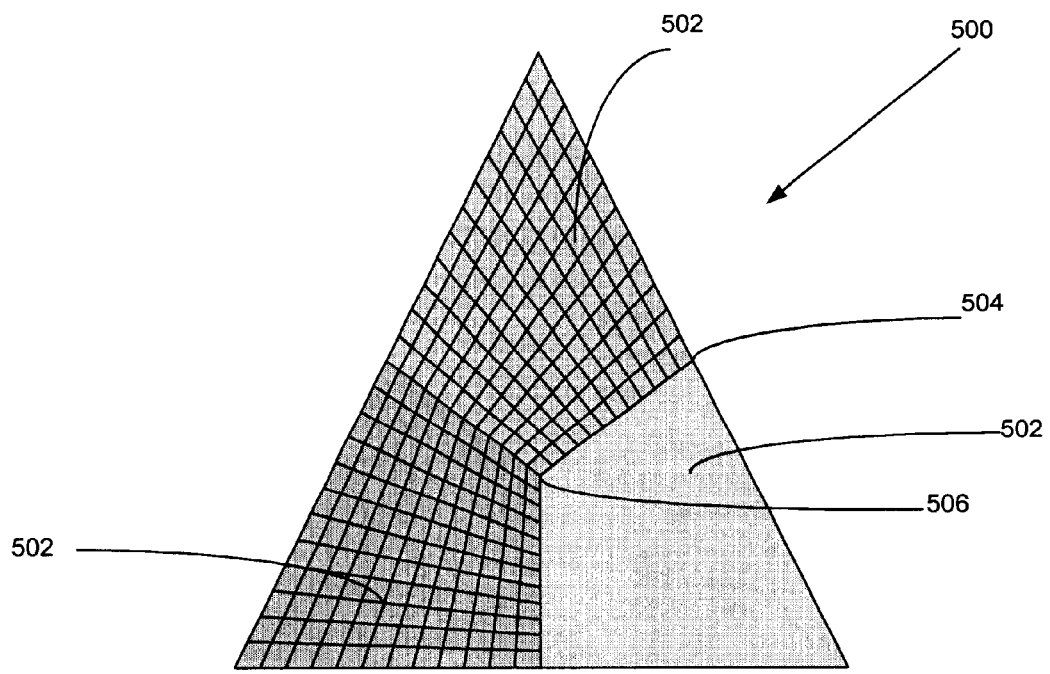
FIG. 5 illustrates the manner in which a triangular patch is converted in accordance with the method of FIG. 4.

FIG. 5 illustrates the manner in which a triangular patch is converted in accordance with the method 400 of FIG. 4. As shown, the triangular patch 500 is divided up to into a plurality of quadrilateral patches 502. In one embodiment, each quadrilateral patch 502 is convex.

As an option, one corner 504 of each quadrilateral patch 502 may be positioned at a midpoint of a side of the triangular patch 500. Further, one corner of each quadrilateral patch 502 may be positioned at a centroid 506 of the triangular patch 500. It should be understood that in various other embodiments, the corners may be positioned in any desired location. Further, the number of quadrilateral patches may vary per the desires of the user.

One constraint that may be imposed on the boundaries of the quadrilateral patches 502 is that they form a convex region of four sides, each of which is a straight line in the parameter space of the triangular patch 500. As an option, each side of the quadrilateral patches 502 may be linear in parameter space. Further, in one embodiment, a single vertex may be situated on the interior of the triangle, and one vertex on each of the three sides of the triangular patch 500. Note FIG. 5.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for converting triangular patches for being rendered using a graphics pipeline adapted to render quadrilateral patches during computer graphics processing, comprising:

receiving a triangular patch; and dividing the triangular patch into a plurality of quadrilateral patches for being rendered using a graphics pipeline adapted to render the quadrilateral patches during computer graphics processing;

wherein a decree of the triangular patch is preserved utilizing a re-parameterization.

2. The method as recited in claim 1, wherein each quadrilateral patch is convex.

3. The method as recited in claim 1, wherein one corner of each quadrilateral patch is positioned at a midpoint of a side of the triangular patch.

4. The method as recited in claim 3, wherein one corner of each quadrilateral patch is positioned at a centroid of the triangular patch.

5. The method as recited in claim 1, wherein each side of the quadrilateral patches is linear in parameter space.

6. The method as recited in claim 1, wherein the triangular patches are processed without trimming.

7. A computer program embodied on a computer readable medium for converting triangular patches for being rendered using a graphics pipeline adapted to render quadrilateral patches during computer graphics processing, comprising:

a code segment for receiving a triangular patch; and a code segment for dividing the triangular patch into a plurality of quadrilateral patches for being rendered using a graphics pipeline adapted to render the quadrilateral patches during computer graphics processing;

wherein a degree of the triangular patch is preserved utilizing a re-parameterization.

8. The computer program as recited in claim 7, wherein each quadrilateral patch is convex.

9. The computer program as recited in claim 7, wherein one corner of each quadrilateral patch is positioned at a midpoint of a side of the triangular patch.

10. The computer program as recited in claim 9, wherein one corner of each quadrilateral patch is positioned at a centroid of the triangular patch.

11. The computer program as recited in claim 7, wherein each side of the quadrilateral patches is linear in parameter space.

12. The computer program as recited in claim 7, wherein the triangular patches are processed without trimming.

13. A system for converting triangular patches for being rendered using a graphics pipeline adapted to render quadrilateral patches during computer graphics processing, comprising:

a patch conversion module for receiving a triangular patch, and dividing the triangular patch into a plurality of quadrilateral patches for being rendered using a graphics pipeline adapted to render the quadrilateral patches during computer graphics processing; and a rasterizer coupled to the patch conversion module for rendering the quadrilateral patches;

wherein a degree of the triangular Patch is preserved utilizing a re-parameterization.

14. The system as recited in claim 13, wherein each quadrilateral patch is convex.

15. The system as recited in claim 13, wherein one corner of each quadrilateral patch is positioned at a midpoint of a side of the triangular patch.

16. The system as recited in claim 15, wherein one corner of each quadrilateral patch is positioned at a centroid of the triangular patch.

17. The system as recited in claim 13, wherein each side of the quadrilateral patches is linear in parameter space.

18. The system as recited in claim 13, wherein the triangular patches are processed without trimming.

19. A method for converting triangular patches for being rendered using a graphics pipeline adapted to render quadrilateral patches during computer graphics processing, comprising:

receiving a triangular patch;

dividing the triangular patch into a plurality of quadrilateral patches while preserving geometric properties of tie triangular patch utilizing a re-parameterization; and wherein the quadrilateral patches are suitable for being processed by a graphics pipeline equipped to render quadrilateral patches.

20. The method as recited in claim 19, wherein the re-parameterization includes calculation of u-values and v-values as a function of s-values and t-values.

21. The method as recited in claim 20, wherein the re-parameterization includes.

$$u = \frac{s}{2} - \frac{st}{6} \quad v = \frac{t}{2} - \frac{st}{6}.$$

\* \* \* \* \*

UNITED STATES PATENT AND TRADEMARK OFFICE
CERTIFICATE OF CORRECTION

| | |
|---|---|
| PATENT NO. | : 6,704,010 B1 |
| APPLICATION NO. | : 09/655105 |
| DATED | : March 9, 2004 |
| INVENTOR(S) | : Moreton |

Page 1 of 1

It is certified that error appears in the above-identified patent and that said Letters Patent is hereby corrected as shown below:

col. 4, line 58 replace "decree" with --degree--;
    col. 6, line 3 replace "Patch" with --patch--;
    col. 6, line 14 replace "tie" with --the--.

Signed and Sealed this

Sixteenth Day of February, 2010

David J. Kappos
*Director of the United States Patent and Trademark Office*